(12) United States Patent
Vasilevsky

(10) Patent No.: US 8,326,338 B1
(45) Date of Patent: Dec. 4, 2012

(54) SYNTHETIC RADIO CHANNEL UTILIZING MOBILE TELEPHONE NETWORKS AND VOIP

(75) Inventor: Andrey Vasilevsky, Moscow (RU)

(73) Assignee: OnAir3G Holdings Ltd., Tortola (VG)

( * ) Notice: Subject to any disclaimer, the term of this patent is extended or adjusted under 35 U.S.C. 154(b) by 0 days.

(21) Appl. No.: 13/415,899

(22) Filed: Mar. 9, 2012

Related U.S. Application Data

(60) Provisional application No. 61/468,618, filed on Mar. 29, 2011.

(51) Int. Cl.
*H04W 7/00* (2006.01)
(52) U.S. Cl. ........................................ 455/519; 709/204
(58) Field of Classification Search ................. 455/519; 709/204
See application file for complete search history.

(56) References Cited

U.S. PATENT DOCUMENTS

| | | | |
|---|---|---|---|
| 4,550,222 A * | 10/1985 | Hanni et al. ................... | 380/269 |
| 6,483,901 B1 * | 11/2002 | Cuallo ......................... | 379/88.28 |
| 6,671,262 B1 * | 12/2003 | Kung et al. ................... | 370/260 |
| 6,816,469 B1 * | 11/2004 | Kung et al. ................... | 370/260 |
| 6,823,184 B1 * | 11/2004 | Nelson ........................ | 455/418 |
| 7,359,623 B2 * | 4/2008 | Murakami .................... | 386/351 |
| 7,401,128 B1 * | 7/2008 | Mueller ........................ | 709/217 |
| 7,586,899 B1 | 9/2009 | Mohaban et al. | |
| 7,746,847 B2 * | 6/2010 | Chitturi ........................ | 370/352 |
| 7,852,831 B2 | 12/2010 | Akbar | |
| 8,085,920 B1 * | 12/2011 | Bedingfield et al. ..... | 379/202.01 |
| 8,091,028 B2 * | 1/2012 | Spielberg et al. ............ | 715/728 |
| 8,125,988 B1 * | 2/2012 | Sullivan et al. ............... | 370/389 |
| 2003/0055735 A1 * | 3/2003 | Cameron et al. ............... | 705/26 |
| 2005/0135347 A1 * | 6/2005 | Creamer et al. .............. | 370/353 |
| 2006/0100877 A1 * | 5/2006 | Zhang et al. .................. | 704/260 |
| 2006/0111910 A1 * | 5/2006 | Nelson ......................... | 704/270 |
| 2007/0058564 A1 * | 3/2007 | Agrawala et al. ............. | 370/252 |
| 2008/0115087 A1 * | 5/2008 | Rollin et al. .................. | 715/811 |
| 2009/0157693 A1 * | 6/2009 | Palahnuk ....................... | 707/10 |
| 2009/0198356 A1 * | 8/2009 | Goodwin et al. .............. | 700/94 |
| 2009/0257565 A1 * | 10/2009 | Nelson et al. ................... | 379/68 |
| 2009/0293079 A1 * | 11/2009 | Mckee et al. .................... | 725/10 |
| 2009/0307611 A1 * | 12/2009 | Riley ............................ | 715/757 |
| 2010/0115123 A1 * | 5/2010 | Airamo ......................... | 709/234 |
| 2010/0138491 A1 * | 6/2010 | Churchill et al. ............. | 709/204 |
| 2010/0151887 A1 * | 6/2010 | Bobier .......................... | 455/457 |
| 2010/0167709 A1 * | 7/2010 | Varadarajan et al. ....... | 455/414.3 |
| 2010/0184409 A1 * | 7/2010 | Doulton ....................... | 455/412.1 |
| 2010/0241944 A1 * | 9/2010 | Athsani et al. ................ | 715/230 |
| 2010/0248755 A1 * | 9/2010 | Vance et al. ................... | 455/466 |
| 2010/0280965 A1 * | 11/2010 | Vesterinen et al. ........... | 705/319 |
| 2010/0299390 A1 * | 11/2010 | Alameh et al. ................ | 709/204 |
| 2011/0007733 A1 * | 1/2011 | Kubler et al. ................. | 370/352 |
| 2011/0066941 A1 * | 3/2011 | Chipchase et al. ............ | 715/716 |

(Continued)

*Primary Examiner* — Hai Nguyen
(74) *Attorney, Agent, or Firm* — Bardmesser Law Group

(57) ABSTRACT

A system for generating a synthetic radio channel, including a server in communication with a plurality of mobile communications devices that provide their geolocation information to the server; the server receiving user voice data; the server associating each mobile communication device with a group of mobile communication devices within a geographic proximity radius to each one; the server generating a synthetic customized voice channel for each communication device comprising a stream of chunks of voice data generated from the voice data provided by the communication devices of the group of mobile communication devices; and the server dynamically adjusting the geographic proximity radius and which mobile communication devices associated with the group based on movement of the mobile communication device, a number of mobile communication devices in the group and movement of the mobile communication devices in the group.

18 Claims, 11 Drawing Sheets

U.S. PATENT DOCUMENTS

| | | | |
|---|---|---|---|
| 2011/0078252 A1* | 3/2011 | Macwan | 709/206 |
| 2011/0142016 A1* | 6/2011 | Chatterjee | 370/338 |
| 2011/0161085 A1* | 6/2011 | Boda et al. | 704/260 |
| 2011/0195739 A1* | 8/2011 | Deleus et al. | 455/518 |
| 2011/0238755 A1* | 9/2011 | Khan et al. | 709/204 |
| 2011/0251840 A1* | 10/2011 | Cook et al. | 704/207 |
| 2011/0320545 A1* | 12/2011 | Hammer et al. | 709/206 |
| 2012/0059918 A1* | 3/2012 | Gadde et al. | 709/223 |
| 2012/0079062 A1* | 3/2012 | Fonseca et al. | 709/217 |
| 2012/0089390 A1* | 4/2012 | Yang et al. | 704/207 |
| 2012/0095819 A1* | 4/2012 | Li | 705/14.23 |
| 2012/0126974 A1* | 5/2012 | Phillips et al. | 340/539.13 |
| 2012/0129553 A1* | 5/2012 | Phillips et al. | 455/456.3 |
| 2012/0130721 A1* | 5/2012 | Sirivara et al. | 704/500 |
| 2012/0136998 A1* | 5/2012 | Hough et al. | 709/225 |
| 2012/0143994 A1* | 6/2012 | Calcev et al. | 709/219 |

* cited by examiner

Channel Formation

- When a subscriber connects to the system or when he chooses a channel, a proximity radius is defined, and other users in that proximity radius are added to the channel
- The proximity radius can increase or decrease, based on number of people talking in the channel and number of subscribers in a given radius

SYNTHETIC RADIO CHANNEL UTILIZING MOBILE TELEPHONE NETWORKS AND VOIP

CROSS-REFERENCE TO RELATED APPLICATIONS

This application is a non-provisional of U.S. Provisional Patent Application No. 61/468,618, filed on Mar. 29, 2011, which is incorporated by reference herein in its entirety.

BACKGROUND OF THE INVENTION

1. Field of the Invention

The present invention is related to creation of synthetic radio channels using mobile and Voice over IP technology in combination with geolocation services.

2. Background of the Related Art

At the present time, many systems are known that provide for various forms of voice communication, including Voice over IP mechanisms, such as Skype or similar services. Typically, such systems require a user to log in and provide some identifying information about himself. The same normally applies to both one-to-one communication, as well as one-to-many communications (i.e., conference voice chat in Skype, and similar products). None of the conventional systems permit a user to communicate without providing some sort of identifying information about himself (such as a user name, user ID, or similar).

At the same time, it is empirically observable that many people want to communicate, under some circumstances, in an anonymous fashion, in other words, without providing any identifying information about themselves to other participants. One such situation is commentary on some blogs or news feeds, where anonymous Internet users can comment about new stories or blog posts. However, there is no analog of such a system in the context of voice or radio communication.

Another reality of modern life is the need for people to dedicate a significant part of their daily routine to what is essentially unproductive time. For instance, for many people, a commute to work consumes anywhere between half an hour and an hour and a half. As a practical matter, there is little productive work that a person can do while sitting in a car, particularly while sitting in traffic.

Another fact of life is that people like to communicate, and often to do so anonymously—both to "say something", and to hear other people, who are in some sense in proximity to each other and to them. For instance, when a person stands in a crowd, he can ask the question "What's going on here? Why is there a line?" The question is not addressed to any particular person, necessarily, but the information requested—why there is a line (or, in the context of traffic, why there is a traffic jam on that particular street or stretch of a highway) is of interest to those people who are in proximity to the person asking the question. There is, at this time, no conventional mechanism to implement such a scheme using mobile telephony or Internet telephony.

Accordingly, there is a need in the art to enable users to communicate anonymously with those in proximity to themselves, using mobile telephony and Internet telephony as a transmission mechanism.

SUMMARY OF THE INVENTION

Accordingly, the present invention is related to formation of a synthetic radio channel using mobile telephony and VOIP, which substantially obviates one or more of the problems and disadvantages of the related art.

In one aspect, there is provided a system, method and computer program product for generating a synthetic radio channel, including a server in communication with a plurality of mobile communications devices that provide their geolocation information to the server. The server receives user voice data from the mobile communication devices. The server associates each mobile communication device with a group of mobile communication devices within a geographic proximity radius to the each mobile communication device. The server generates a synthetic voice channel customized for each communication device from a stream of chunks of voice data (for example, 10-20 seconds long each) generated from the voice data provided by the communication devices of the group of mobile communication devices. The server dynamically adjusts the geographic proximity radius and which mobile communication devices associated with the group based on movement of the mobile communication device, a number of mobile communication devices in the group and movement of the mobile communication devices in the group.

The server also optionally dynamically adjusts a length of the chunks based on the movement of the mobile communication device, a number of mobile communication devices in the group and movement of the mobile communication devices in the group. The server can provide advertising to at least some mobile communication devices based on geographic location of the mobile communication device and/or based on a historic pattern of movement of the at least some mobile communication devices and/or based on profiles of their users that are maintained on the server.

The group can be defined, at least in part, based on social network association of users of the mobile communication devices. At least some mobile communications devices can operate in a demo mode that does not permit their users to generate the voice data for channels for other mobile communications devices. The server has a database of chunks of voice data that can include private voice messages intended only for specified mobile communications devices. Optionally, the server can generate synthetic voice channels that can only be received by specific subscribers.

Optionally, the geographic proximity radius of at least some of the mobile communication devices is determined based on proximity to a mobile base station. Optionally, at least some of the mobile communications devices can send, through the server, private messages to any device connected to a mobile network. The server can also alter the voice data chunks to (a) disguise a voice of a subscriber, (b) remove speech defects, or (c) compress duration of the voice data chunks.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incor- In the drawings.

DETAILED DESCRIPTION OF EMBODIMENTS OF THE INVENTION

Figure 1:
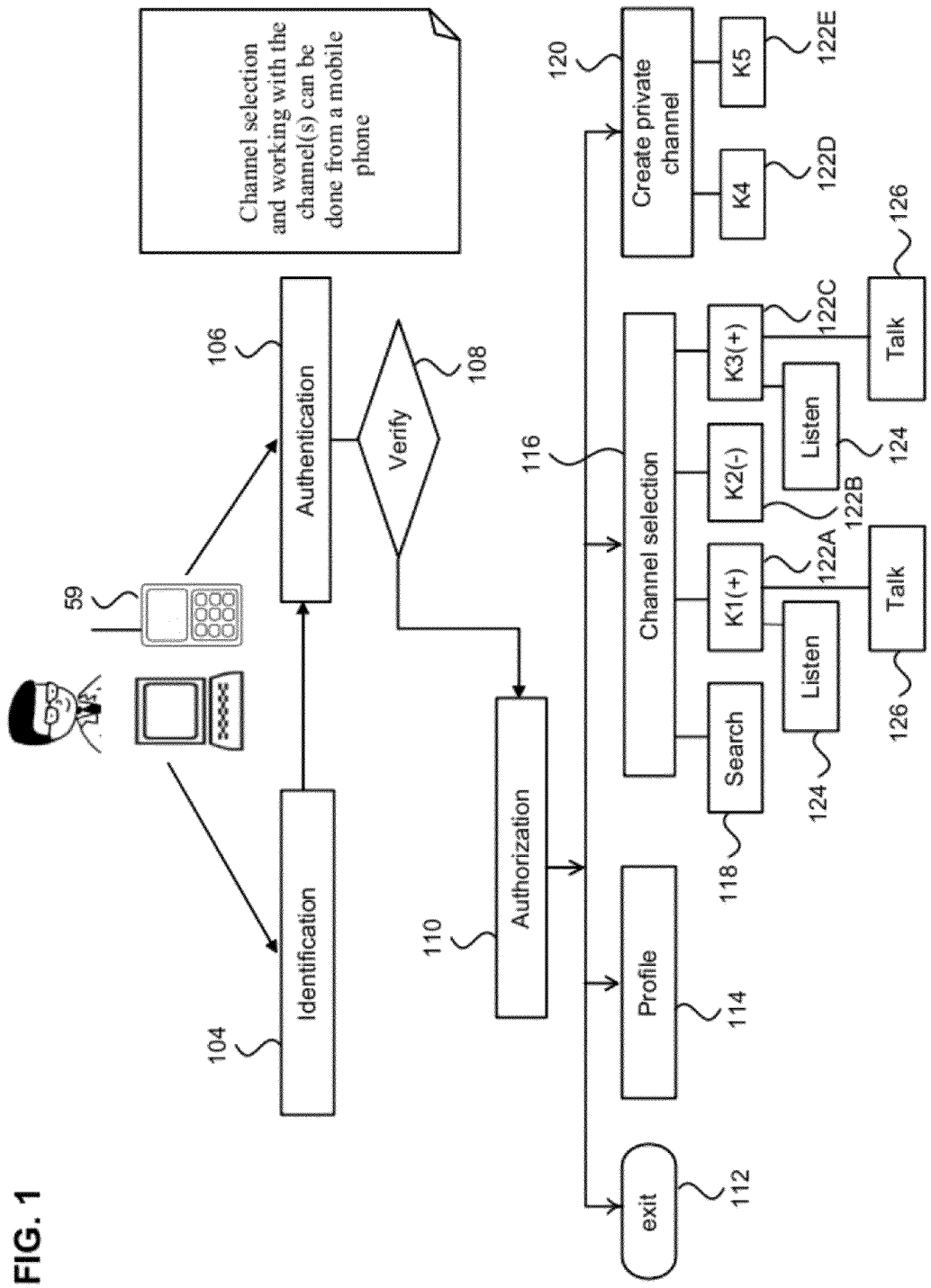
FIG. 1 illustrates a general schematic of user identification, authentication and channel selection.

Reference will now be made in detail to the preferred embodiments of the present invention, examples of which are illustrated in the accompanying drawings.

The present invention involves interaction between a user's communication device, such as a mobile phone, a smart phone, a PDA, a tablet, or similar, a desktop, Smart TV and set-top-boxes, and a server 20 (see FIG. 2) that generates an individual channel for each subscriber. The user's communications device has an application installed and running on it, which communicates continuously (or as necessary) with the server 20, and provides information about the user's current location. This information is derived from a GPS/GLONASS/Galileo or similar receiver (or, alternatively, or in addition to, from base tower information and/or wi-fi location), and is readily available in many current smart phones and similar type devices. On the server 20 side, the server 20 receives the user's information from the user's mobile device, and identifies a group of subscribers, based on their own transmitted geolocation information, who are in proximity to that particular user 102 (see FIG. 1).

The definition of proximity is dynamically adjusted, based on the current position of the user 102 and the position of other users 102. It has been established empirically that a group of people somewhere between 80 and 120 is optimal for the form of communication described herein. Typically, in any said group of people, everyone is not talking at once—at any given time, usually only a handful of people are talking, and most people are listening—hence, the approximate number of people who are associated with a particular user's channel is roughly 100. This means that the radius around the user 102, where other users 102 defined to be in proximity with that user 102, can shrink or extend.

For example, in a rural area, in order to identify 100 subscribers in proximity to that user 102, the radius might need to be expanded to several miles. On the other hand, on a busy city street in a major metropolitan area, the radius might need to be shrunk to less than a few hundred feet. Note that the radius may need to shrink and expand both as the user 102 moves (for example, the user 102 is in a car, and is moving at some speed along a highway), and as the other subscribers move in and out of his proximity radius. The change in the radius and in the identities of the other subscribers may change relatively slow, or relatively fast—for example, if most of the "actors" involved are on foot in a crowded pedestrian area of a city, the subscribers associated with the particular channel that is in turn associated with one particular user 102 will change relatively slowly. A similar situation will occur in case of a traffic jam, where the cars are either stationary or moving at a crawl.

On the other hand, if a user 102 is driving on a highway (or riding a train) then the identities of the other subscribers can change fairly rapidly.

Each user 102 may or may not be allowed to contribute to the conversation in his channel. As one option, without a log-in, a user 102 may be allowed to listen to a channel dedicated to him, but not to speak, so that the other subscribers (for whom this particular user 102 is "just another subscriber") will never hear him. On the other hand, if a user 102 logs in, then he may be allowed to speak into the channel, and be heard by others.

Normally, the user 102 can speak only for a limited time, for example, 10, 15, or 20 seconds, and that voice "chunk" is then placed into a queue by the server 20, and ultimately transmitted to those subscribers for whom this user 102 is part of their channel. Note that in a particularly crowded area, or where there is a large number of subscribers (for example, for some reason, such a number might be substantially more than 100), then the amount of time that a particular user 102 is allowed to "broadcast" may be reduced. On the other hand, if the server 20 detects that very few people are actually talking at any given moment, or where there is simply aren't enough subscribers in proximity (for instance, because it is a rural area, or because of the time of day or night, etc.), then a user 102 who wishes to speak may be allowed to speak for a longer period of time. Thus, longer "conversation chunks" are placed into the queue. However, the idea is that two people will not be talking over each other, but each chunk of the conversation from each individual user 102 will be queued sequentially.

Additionally, depending on the subscription plan, the user 102 may or may not be required to listen to advertising. The advertising, normally, will also be of a limited duration. The advertising also can be specifically targeted to a particular user 102. For instance, if one user 102A frequently talks about BMWs, and another user 102B frequently talks about Chryslers, then the synthetic channel for user 102A can have an advertisement for BMWs or for spare parts of service for BMWs, placed into his queue. For user 102B, advertising for Chrysler-related products, can be placed into his queue.

Also, the advertising targeted to a particular user 102 can be matched to his geographic location. For instance, a new fitness club that just opened on a street where the user 102 is driving at the moment would, obviously, wish to target their advertisements towards that user 102, but not towards a subscriber who is located on the opposite side of town. This, therefore, recognizes that many products and services have limited geographic appeal (unlike others, which have universal appeal, regardless of where the user 102 is located).

As yet a further option, the server 20 can establish channels based not just on geographic proximity but also based on language spoken, and/or based on subject matter of the discussion. A similar scheme exists on many online forums, where the subject matter of the discussion is broken up by subject matter (for example, politics, economics, computers, automobiles, etc.). Thus, in addition (or instead of) simple geographic proximity of one user 102 to other users, a user 102 can subscribe (either pre-subscribe, on a computer and over the Internet) or on his mobile device, to a particular subject matter channel. Then, similar rules about the number of subscribers in that channel, that are associated with a particular user 102, would apply.

For instance, in a large city, there might be 300 people who are currently discussing politics, but only 50 people currently discussing automobiles. Thus, in that city, the server 20 would establish roughly 3 channels for discussion of politics (and then associate the users with that channel geographically), but—given that there are only 50 people—there would only be one channel to discuss automobiles.

Also, the server 20 can detect that a particular channel is generating a lot of active discussions (for example, politics right after the occurrence of some political events), and therefore might reduce the number of people in that channel and/or increase the length of time allocated to each user's chunk. Also, the server 20 could a priori define that in a general purpose channel (i.e., for example, based solely on the proximity), voice chunks should be typically no more than 10 or 15 seconds, for example, because, as a general matter, a very common topic of discussion is traffic conditions—which does no require lengthy conversation chunks from the users, and one or even a handful of users should not normally monopolize the entire "conversation". On the other hand, some subject-matter-based channels might have longer chunks, since discussion of, for example, computers, might be conducted more appropriately with, for instance, 20-, or 30-, or 40-second chunks.

As yet another option, a user 102 can be given a choice to distort his voice, through known techniques for voice processing. This can be in the form of a random distortion, or in the form of making one user's voice sound, for example, like some famous persons' voice. As yet another option, various speech defects, if identified, can be removed, particularly to shorten the chunks, without affecting the information transmitted. For instance, if a speaker stutters, or has a lot of "ums" and "ahs", those can be removed through voice processing, without affecting the understandability of the chunk.

As one example, voice to text, and text to voice, can be employed for this purpose.

As yet another option, the user 102 can predefine a group that is geographic, but not necessarily close to him in the proximity sense. For example, if a user 102 normally takes a particular set of highways to work, he may be interested in traffic conditions along that entire road, but not particularly interested in conditions off the highway, or more than 200 feet, from the highway. Thus, the subscribers that are in his "quasi-proximity" group are actually stretched into a stripe that matches the path that he takes to work. The user 102 can predefine such a path, or several such paths, and select one that he is taking at that particular moment. As yet a further option, the server 20 can recognize that the synthetic quasi-proximity group that the user 102 has defined, in fact, represent the path that he is driving on, and the user 102 is only interested in traffic conditions ahead of him on the path, but not behind—thus, initially, as the user 102 sets out on the path, there might be a lot of subscribers in the channel, but as the user 102 progresses down the path, the subscribers that he "leaves behind" will have no more useful information for him, and will be deleted from the quasi-proximity group.

Another example would a "friends and family" set of subscribers (even if the set of subscribers defined as "friends and family" is not geographically proximate).

As yet a further option, the user 102 can elect to record (i.e., store) what he hears and/or says on the channel, for later playback and analysis. Normally, the storage of the voice chunks will be for a finite amount of time, with an option for the user 102 to pay additional premium for the service to store the chunks for longer than, for example, a day, or a week, or a month.

As yet another option, the advertising can be targeted to a particular user 102 based on his movement patterns. Empirically, it has been established, that most people's movements are often reasonably predictable—in other words, to and from work, to and from the grocery store, to and from school, to and from a health club, etc. While the predictability is less than 100%, obviously, nevertheless, many people's movements follow set patterns, at least based on the analysis of their mobile phones' geolocation data. Thus, the advertising could be targeted towards a particular user 102 based not only on his current location, but also on the locations where he can frequently be found. In other words, a health club that just opened, that is on a street that the user 102 takes to work, can target advertising towards that particular user 102 even though the user 102, at that moment, is not, actually, anywhere near that health club—but it is known that he passes by the health club periodically.

Normally, the mobile communication device connects to the server 20 using the TCP/IP protocol. Other technologies, such as CDMA, GPRS, etc., can also be employed. Generally, to conserve traffic and mobile communication device resources, there are two types of connection—a signal connection and a main connection. This permits being online even when the application is turned off. A resident program remains in memory, and maintains the signal connection. When a push-notification is received, the message can be displayed on a screen, or the main program can be launched.

Note also that if a particular mobile phone does not have geolocation capability, other means of identifying one's location can be employed, for example, by detecting and identifying Wi-Fi hotspots near the mobile phone (assuming that the geographic position of the Wi-Fi hotspots is known), or by triangulation using the mobile telephone base stations.

Note also that communication can be either in the peer to peer mode, or, more commonly, one-talks-others-listen mode. However, it is possible to conceive of a situation where multiple people can be allowed to talk at the same time. It is expected however that more than a small handful of people talking at the same time on the same channel is not practical.

Normally, the client side application will have a button for the user 102 to press when he wants to talk. As one option, the client side application will limit the user 102 to a particular client that he can talk to (for example, indicating by a beep that the 10 or 20 second chunk is up). As yet another option, the user 102 can talk for an arbitrary length of time, but on a server 20, his speech will be broken up into smaller chunks. As yet a further option, voice chunks that are older than some set period of time (for example, older than 5 minutes, etc.) are discarded.

As yet a further option, the user 102 can individually subscribe for additional information that relates to the subject matter of the channel. As yet a further option, he can request a private chat with a particular speaker.

Also, the user 102 can specify a blacklist of people whom he does not want to hear, even if they meet the other requirements for being included in his channel.

As yet another option, the contents of the channel can be stored in the memory of the client device, for later playback.

As another option, voice recognition software can be used to identify a particular speaker, and to enable a particular subscriber to follow another subscriber (even if that subscriber is outside the proximity area). For instance, a famous personality, or a popular blogger, may have something to say while he drives, and many people might be interested in listening to him—even though that individual is not anywhere near their proximity zone. That person might also be given more than the "standard" time slice (e.g., instead of the usual 10 second slice, he might be given 15 seconds, or 20 seconds). Other users who might be given more than the standard time slice might be users with premium, or super-premium subscriptions, for example, or those designated as having some particular expertise in the subject matter of the channel.

Similarly, the person in question does need to be a famous personality, but merely someone that the particular user 102 has heard previously and enjoys listening to, for whatever reason. Also, the user 102 can "bookmark" favorites as a particular chat, whether based on subject matter, geographic location, etc. Also, these can include permanent (i.e., static) geographic locations—for example, to include subscribers around the particular concert hall or some concert event. By selecting the particular bookmark from the favorites, the user 102 can join such a chat, and then later disconnect from such a chat.

Also, the user 102 can predefine which other subscribers he is interested in hearing in a particular chat or channel. Thus, if at a particular moment, there are no other users of interest to this particular user 102 in that channel, then he will not join that channel (even if there are other subscribers talking in that channel—but not subscribers of interest to that particular user 102).

As yet another option, the synthetic channel can be dedicated to discussion of local tourist attractions, shopping mall and shopping center sales and promotions, etc. Additionally, the synthetic radio channel can be used by emergency services to communicate to subscribers, for example, regarding road closures, poor visibility conditions, etc.

As another option, the subscribers' location can be derived from WIMAX, CDMA, LTE or GSM base station information, etc.

In addition to voice only, video segments can be included, particularly with the increasing use of mobile phones with video recording and playback capability. Text to voice and voice to text can also be used.

Fuzzy logic can also be used to define the proximity radius of the subscriber. When a user 102 logs into the system, his location is determined, and the area around him, in a given radius, is scanned. If there are not enough other subscribers, the system increases the radius. If there are too many other subscribers, the system reduces the radius.

A particular subscriber can be blacklisted by an administrator (if there is one) of a particular channel. Also, a subscriber can blacklist another subscriber, so that in his own channel, he does not hear any voice chunks from that subscriber (even though other subscribers would, in fact, be able to hear him). Also, those subscribers whose conversation does not conform to a particular chat or voice channels tone or general criteria of appropriate behavior, can be blacklisted or moved to another chat, where his conversation would be more appropriate.

As a further option, the synthetic radio channel can be "connected" to a gateway from other systems, such as RDS or CB radio, or 911 services (which have their own radio frequencies for disseminating information to the public). Similarly, the contents of the synthetic radio channel can be sent to the gateways.

Another option is to have a channel, for example, dedicated to tourism at a particular location, where the people talking are primarily local residents or professional tour guides, or other people familiar with local attractions.

Note that in almost all the cases, the client initiates the sending of the voice chunks. The server 20 (or multiple servers) controls the reception and the retransmission.

Also, a user 102 can block himself from receiving voice chunks on a particular channel, if the subject matter of that channel—in his view—has gone too far off topic (but other subscribers don't think so). Also, a subscriber can define a blacklist of other subscribers who would never hear his voice chunks (in a sense, a reverse blacklist). Also, a subscriber can have prerecorded voice chunks that are stored and then transmitted at a particular time to other subscribers' channels.

A subscriber can also use code words for entering a particular channel of chat, or for creation of a chat from a group, for example, from a flash mob.

As one example, the described system allows transitioning from a peer-to-peer mode to P2MP—point to multi-point, and back. As yet another option, background sounds can be added to a channel, for example, music, sounds of nature, etc.

As another option, a family's channel can be tied to the channel of a child (for example, in the listen only regime, in order to monitor what the child is doing).

As another option, a channel can be created based on social network associations of the subscriber (or some subset of his "friends" and/or contacts in the social network, optionally combined with geographic proximity.

In some cases, several chats can be combined into a single chat, for example, due to low activity, or due to similar subject matter, etc.

The chat can also have a tracing function, since the system is not limited to geolocation channels. For example, the group defined by the particular chat can be shown something like a radar representation, where the subscribers are not particularly close to each other geographically, and their mutual location is represented by a "radar" image with markers.

As another option, the subscriber can define, in his settings, that if a particular other subscriber is not present in the channel, then he will be in a listen mode only (or vice versa, in a listen and talk mode, as long as some other subscriber is not there, in the chat.

Voice messengers for various games can also be utilized within the context of the system described herein. For instance, playing Worlds of Warcraft, a user 102 can talk to other players. A user 102 can "merge" his identity to an avatar or a personality in the game (e.g., as an elf, or a vampire, etc.), and movement in a city corresponds to a movement in a virtual game environment.

Some subscriptions can be done automatically, once the user 102 selects that option. For example, a student living in a dormitory can elect to always join the channel for that dormitory when he is in proximity to the dormitory.

FIG. 1 illustrates, in schematic form, how user identification, authentication and channel selection is performed. As shown in FIG. 1, a user 102 typically has a mobile phone or a smart phone 59 (see FIGS. 10-11 and discussion below), which permits him to identify himself (104) and then authenticate himself (106) to the system. If the user's identity is verified (108), the user is authorized, based on his profile (110). Depending on the authorization and the information in his profile 114, the user can perform channel selection 116 for public channels, or create a private channel 120. In the case of a public channel selection 116, the user has an option to search for the channels (118), or select one of the public channels 122A, 122B, 122C. For illustrative purposes, selected channels are marked with (+) and non-selected are marked with (−) on FIG. 1. Depending on the authorization and the user's profile settings, the user can either listen to the channel (124) or be able to also talk into the channel (126).

When the user is done, he can exit (112). As a further option, the user can search for channels by, for example, specific words that are spoken in that channel.

Figure 2:
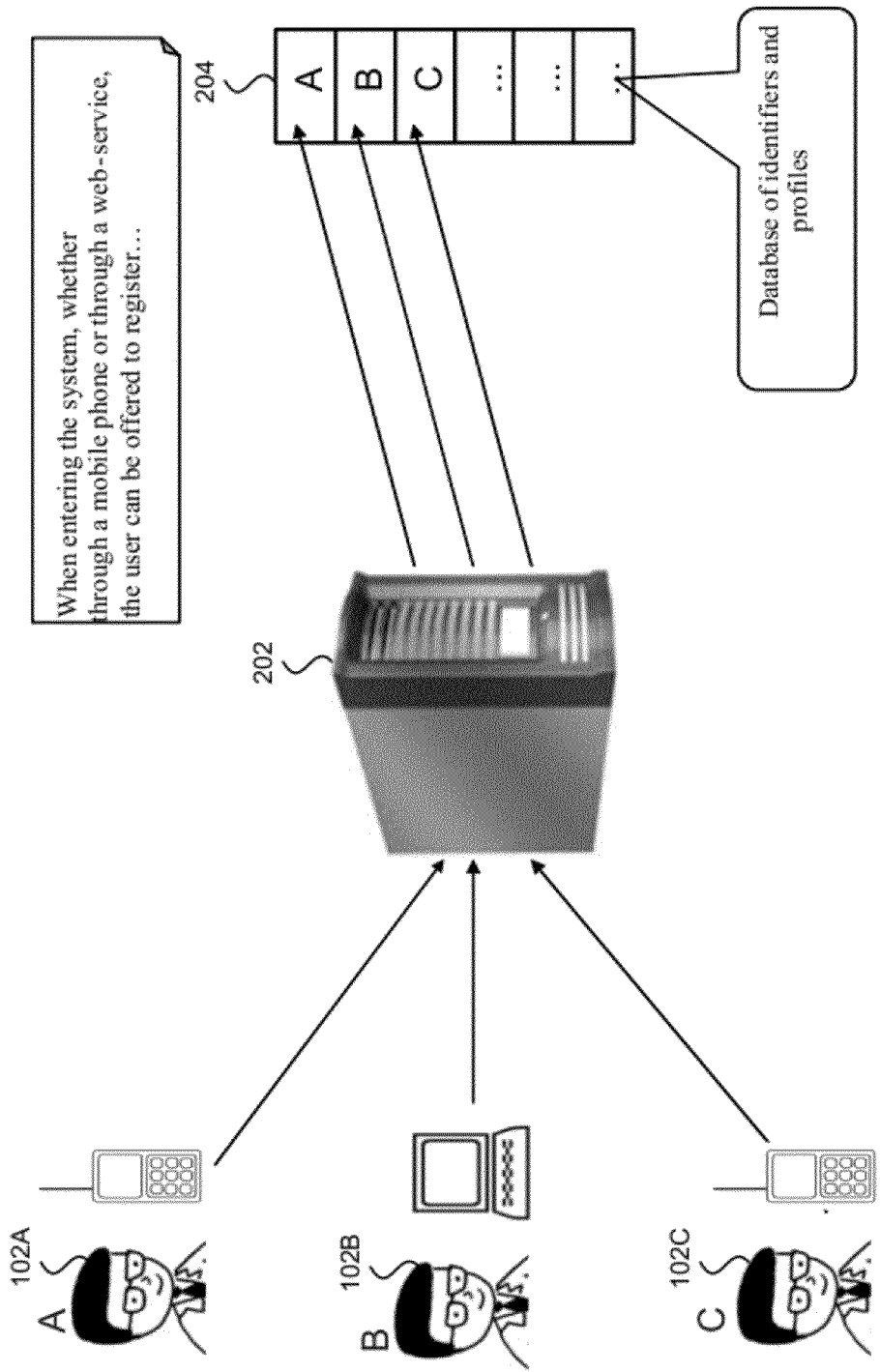
FIG. 2 is a more detailed diagram of authentication of a user.

FIG. 2 illustrates the user identification. As shown in FIG. 2, various users 102A, 102B, 102C, identify themselves to the server 20. The server 20 maintains a database of user identifiers and profiles 204.

Figure 3:
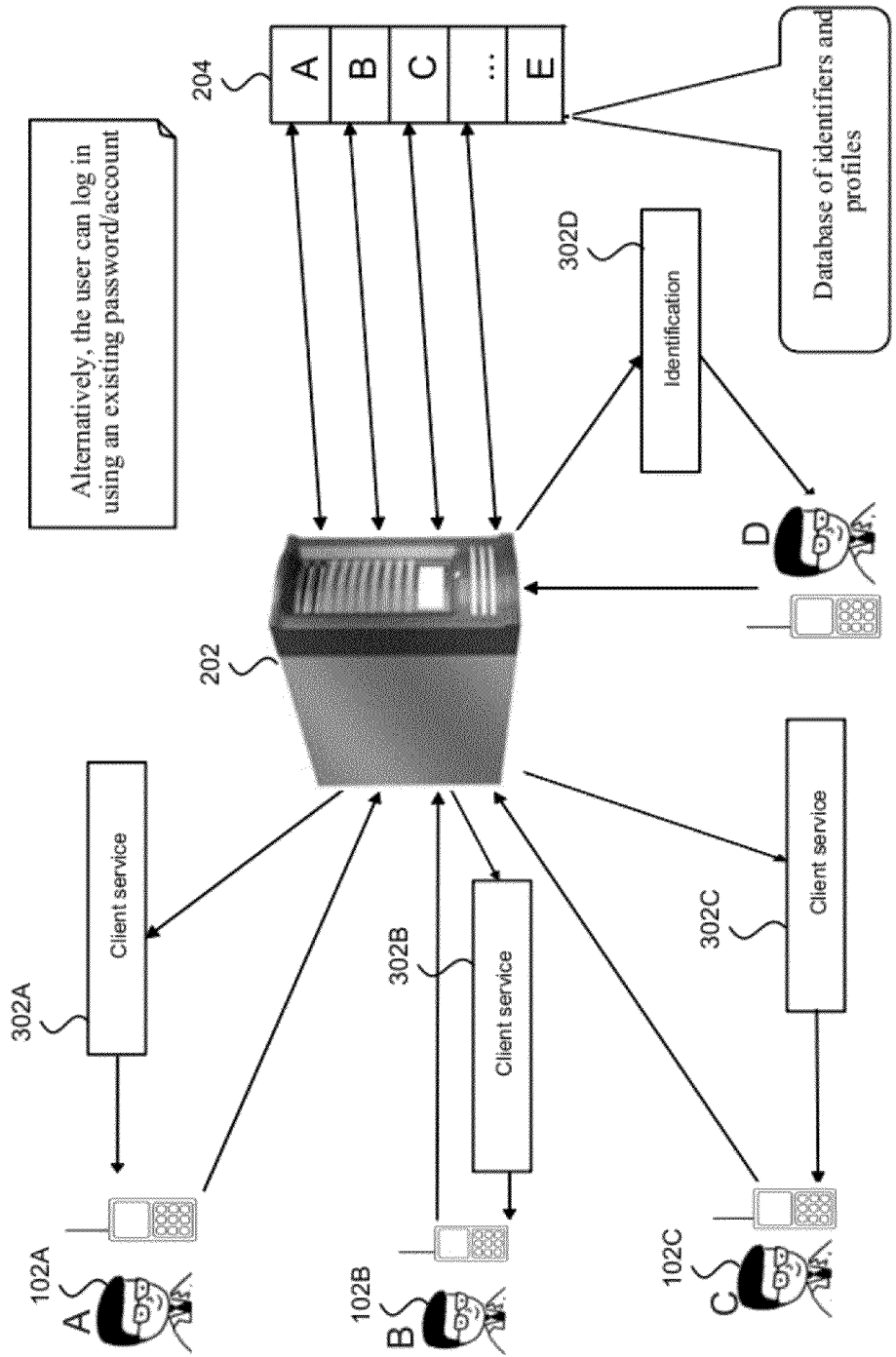
FIG. 3 illustrates authentication of a user.

FIG. 3 illustrates the authentication of a user. As shown in FIG. 3, the users 102A-102C connect to the server 20, and the server 20 provides client services 302A, 302B, 302C, including, but not limited to those illustrated in FIG. 5, FIG. 6 and FIG. 8. In order to authenticate, the server 20 accesses the database 204. In this matter, the user can log in to the system using an existing password and account.

Figure 4:
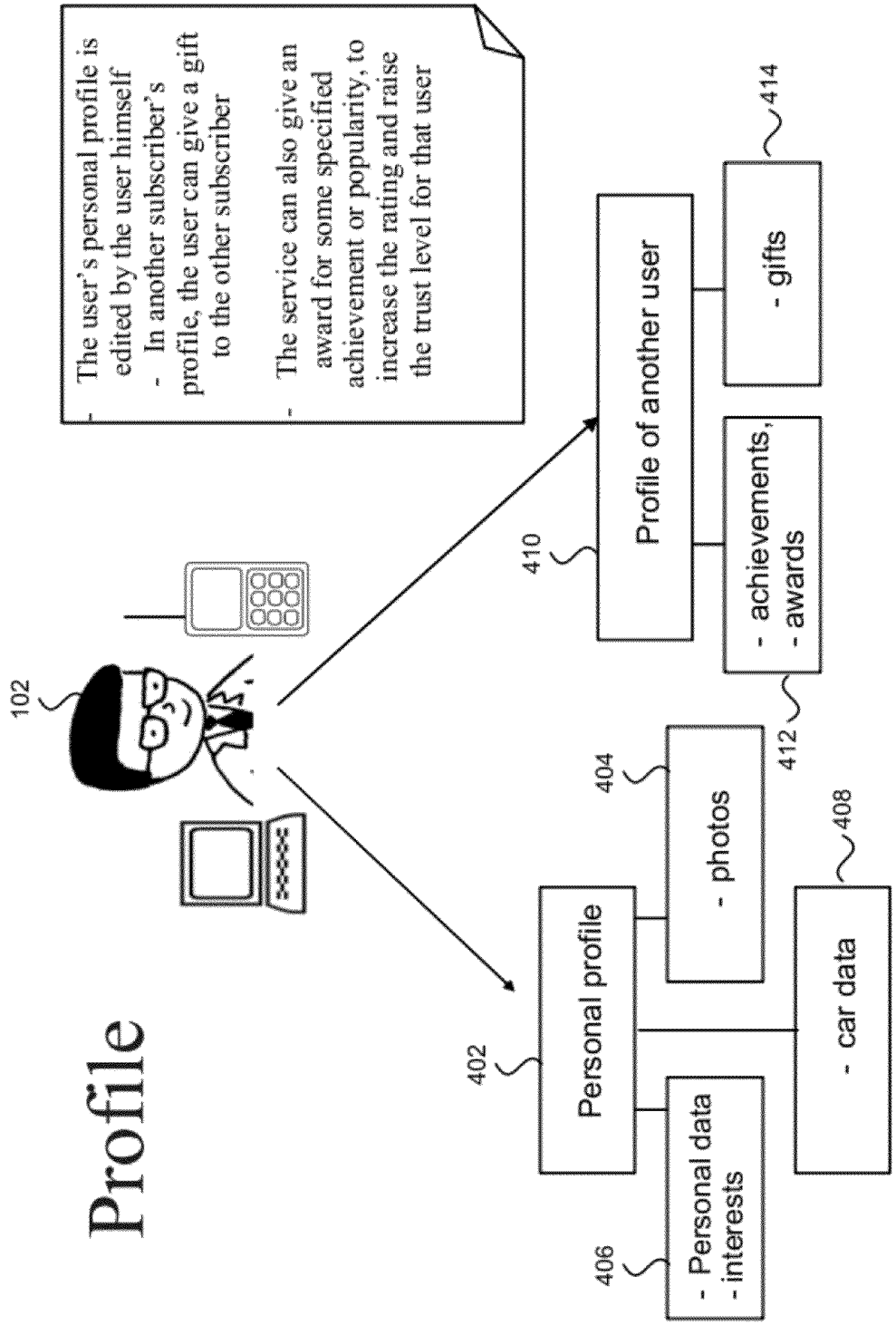
FIG. 4 illustrates the various profile options.

FIG. 4 illustrates how the profile of the user 102 can be maintained. As shown in FIG. 4, each user can have his own personal profile 402, where the user can maintain his own information, some or all of which may be public, and some or all of which may be private. The personal profile 102 can include photographs and images 404, the user's personal data and interests 406, the user's card data 408, and so on. This information can be entered by the user through his mobile phone or smartphone, or can be entered using a personal computer over the Internet.

Additionally, the user can have access to profiles of other users, to the extent that information about those other users is public. The profile of another user 410 can include information about the various achievements and awards received by that user (412), information about the gift that user received (414), other information that the user 102 can rely on to identify the trustworthiness or trust level for the other user, and so on.

Figure 5:
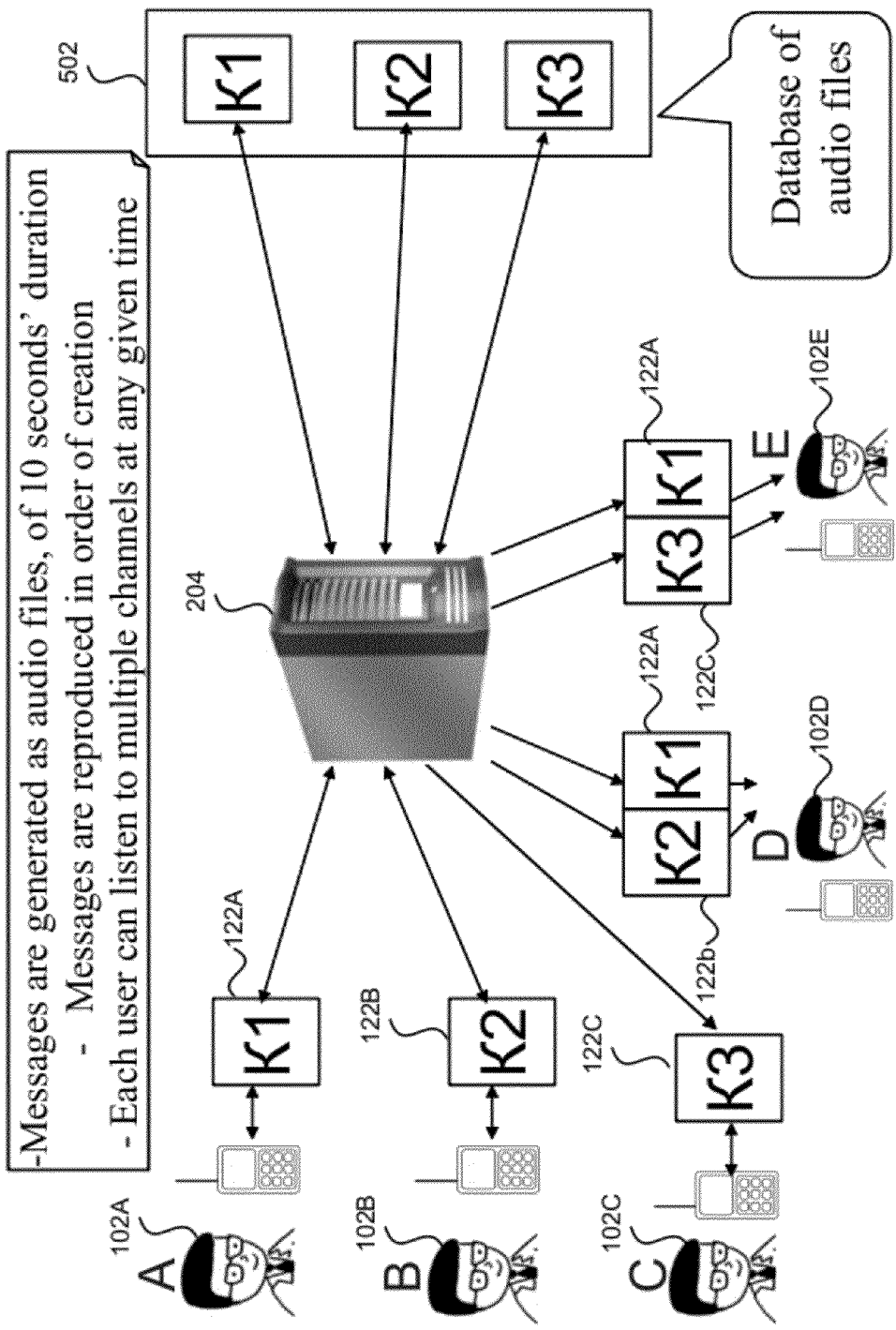
FIG. 5 illustrates how voice chunks are combined into channel audio flow.

FIG. 5 illustrates how speech input of various users of the system 102A-102C is collected and distributed. Here, the server 20 maintains a number of channels 122A, 122B, 122C. In a typical case, each user can speak, and his speech will be broken up into audio file chunks, for example, having a 10 second duration. These chunks are then distributed by the server 20 into the appropriate channels, as shown in the figure. The server 20 maintains a database of audio files 502, each of which can be identified with one or more channels. Note that each user can listen to multiple audio channels at any one time, where the number of channels and the particular channels are being specified by the user, either on the flag or an event.

Figure 6:
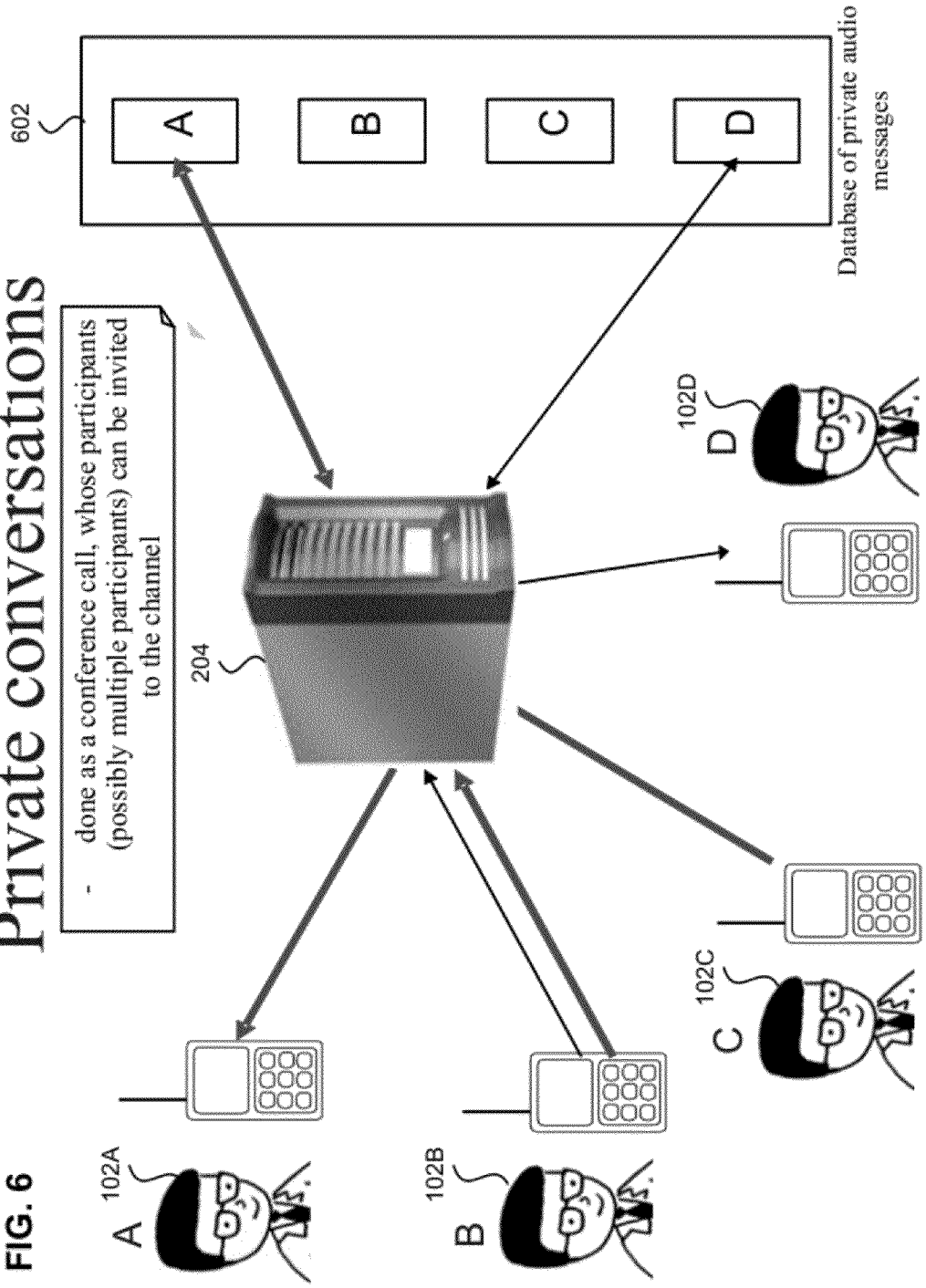
FIG. 6 illustrates chats and private conversations.

FIG. 6 illustrates another option, where users of the system (102A-102D) can set up a private channel, which in effect functions as a conference call, optionally taken into account the proximity of the users, although this is not a requirement. The private audio messages by the users are stored in a database 602, and are then distributed into the private channel only for those users 102 that are participating in that channel.

Figure 7:
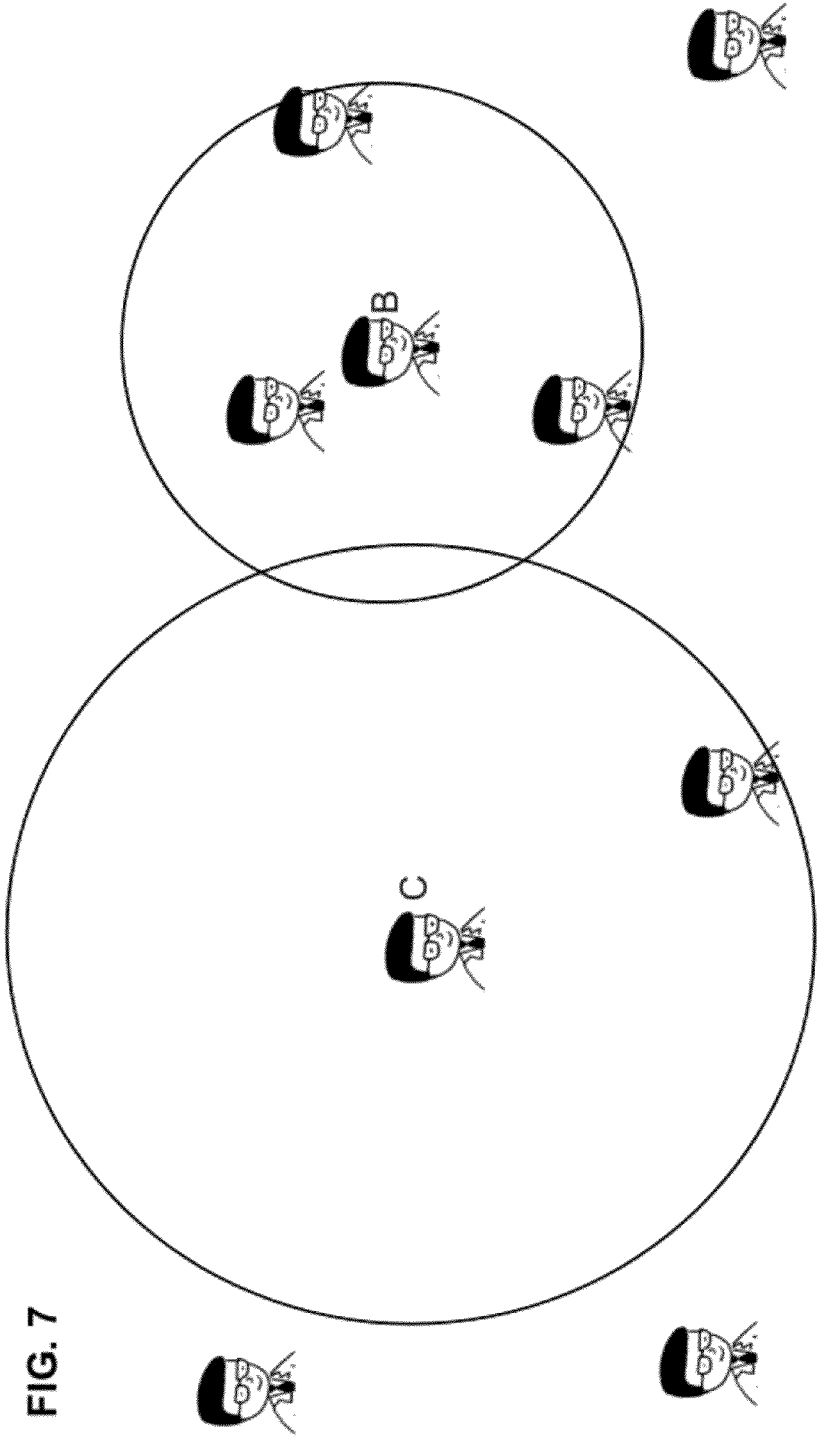
FIG. 7 illustrates the process of channel formation.

FIG. 7 illustrates channel formation. When a user 102 connects to the system, or, alternatively, when a user logs into the system and selects a channel, a proximity radius can be defined for that user, depending on his location and the location of other users. For example, as is seen in FIG. 7, the proximity radius for user B is smaller than the proximity radius for user A, since there are more users in close geographic proximity to user B, versus user C. The proximity radius can expand or contract dynamically, depending on movement of the users of the system, and depending on which users are connected to the system at any given time.

Figure 8:
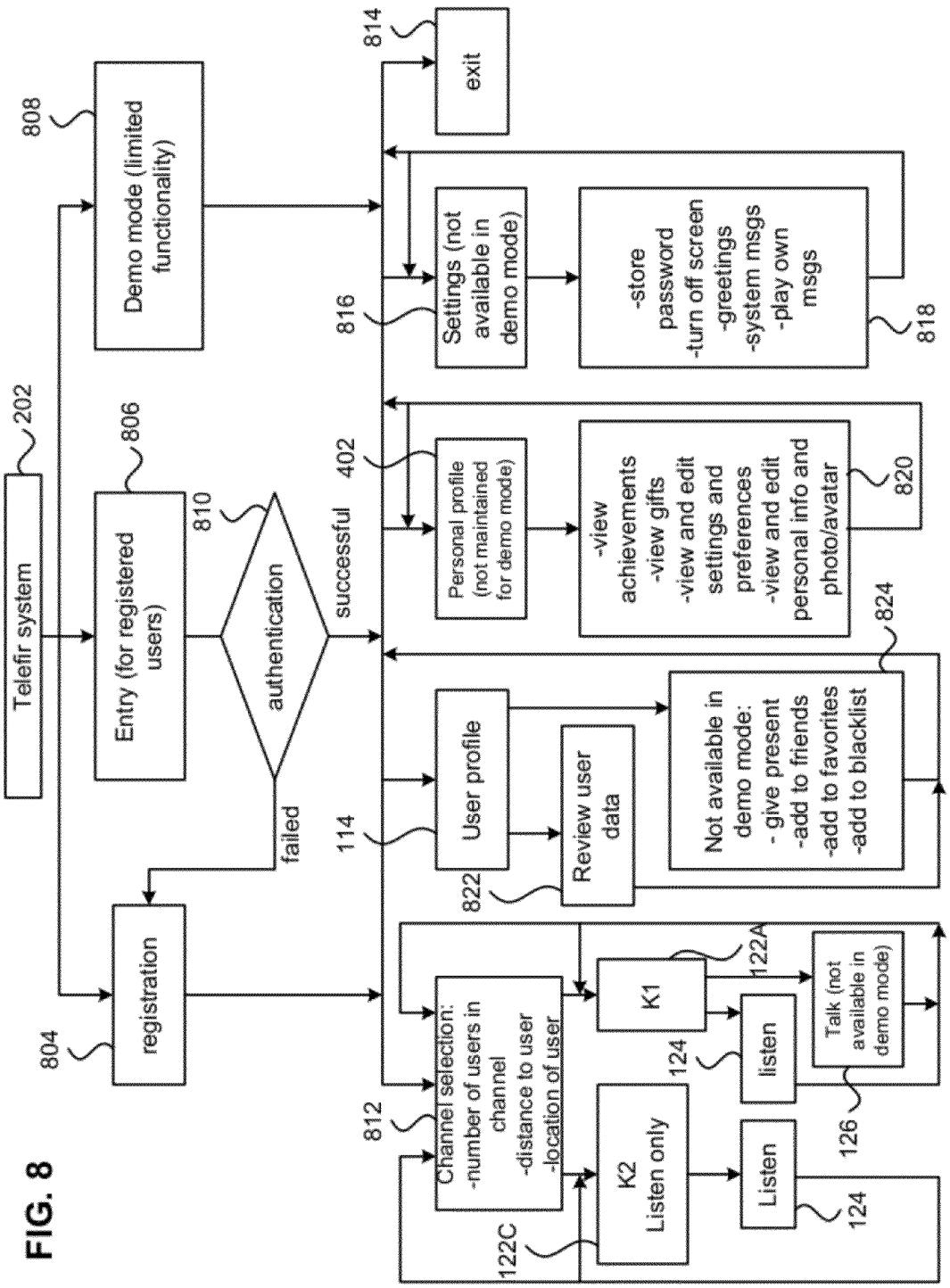
FIG. 8 illustrates the process of forming channels on the server side.

FIG. 8 is another illustration of the various options available to a user upon log-in and authentication. As shown in FIG. 8, the system 802 provides an option of registration for unregistered users (804), entry for registered users (806), and a demo mode with limited functionality (808). Upon authentication (810), if the authentication is successful, the user has options for channel selection 812, as described above, where the channel is formed for each user based on the number of other users in a channel, the users location, the location of other users, and so on. In that mode, the user has options to listen only (122C, 124), to listen and optionally talk (122A, 124, 126).

The user also has an option to modify his profile 114, to review his own data (822) and to perform actions, such as give presents, add friends, add to favorites, add to blacklist, and so on (824). These options are not available in the demo mode. The user also has an option to maintain a personal profile 402, where the user can view his and other user's achievements, gifts, edits settings and preferences, edit personal information, and edit his photo or avatar (820).

Upon log-in, the user can modify his settings (816) and can perform various operations, such as store the password, turn off the screen on his communication device, greetings, play his own messages, and so on. Finally, the user can exit (814). As further options, the system described above can be used to create a dynamic social network, through the use of a communication device, such as a cell phone or a smart phone. The user can establish voice connection with members of a social network based on his location, selection of specific users, other social networks to which the other users and this particular user belongs, and so on. Also, voice advertising can be delivered to members of the social network.

As another option, personal voice messages can be sent to any user of the mobile network. If the user already belongs to the system database (based on his nickname or his phone number), and the user's online, then the message is sent immediately. If the user is offline, then he receives a push-message along the lines of "turn on the synthetic radio system and listen." If the user is unregistered with the system, then he sends a text message along the lines of "click here to listen, click here to download the application." Note that this works not just the smart phones, but with ordinary mobile phones since it is easier to dictate something as opposed to write the text messages on mobile devices. As yet a further option, sharing of data can be available, for example, by the user designating a time slice (or a group of time slices), and the server generating a hyperlink to the audio slice that is stored on the server, so that the audio slice is now accessible over the Internet. The shared data can be accompanied by (associated with), for example, discussions, comments, reviews, podcasts, tags and geolocation tags, especially between mobile and desktop users.

Figure 9:
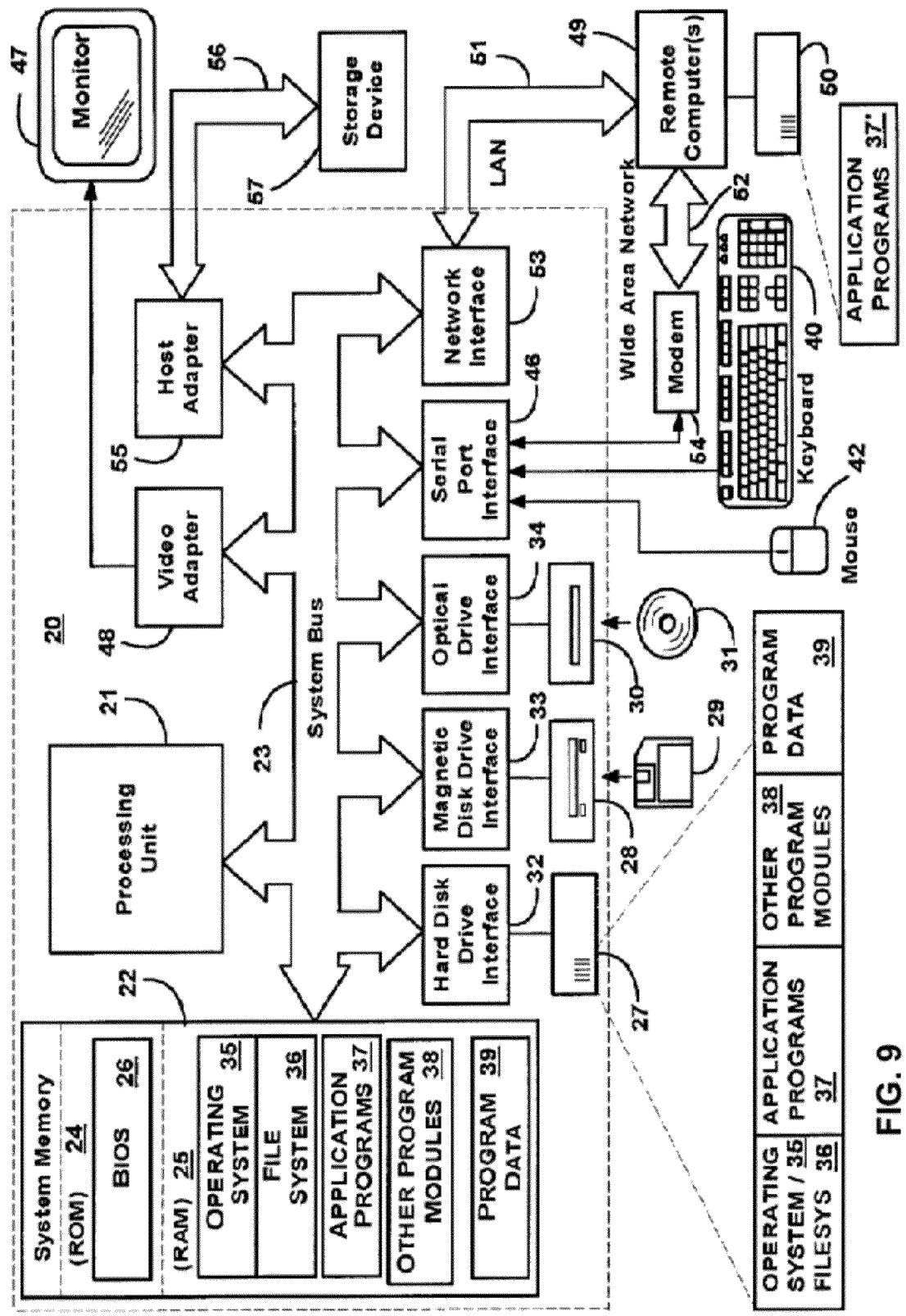
FIG. 9 illustrates an example of a computer that can be used as a server.

With reference to FIG. 9, an exemplary computer system, where the server can be implemented, includes a general purpose computing device in the form of a user-side computer and/or server-side computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 20, such as during start-up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 10:
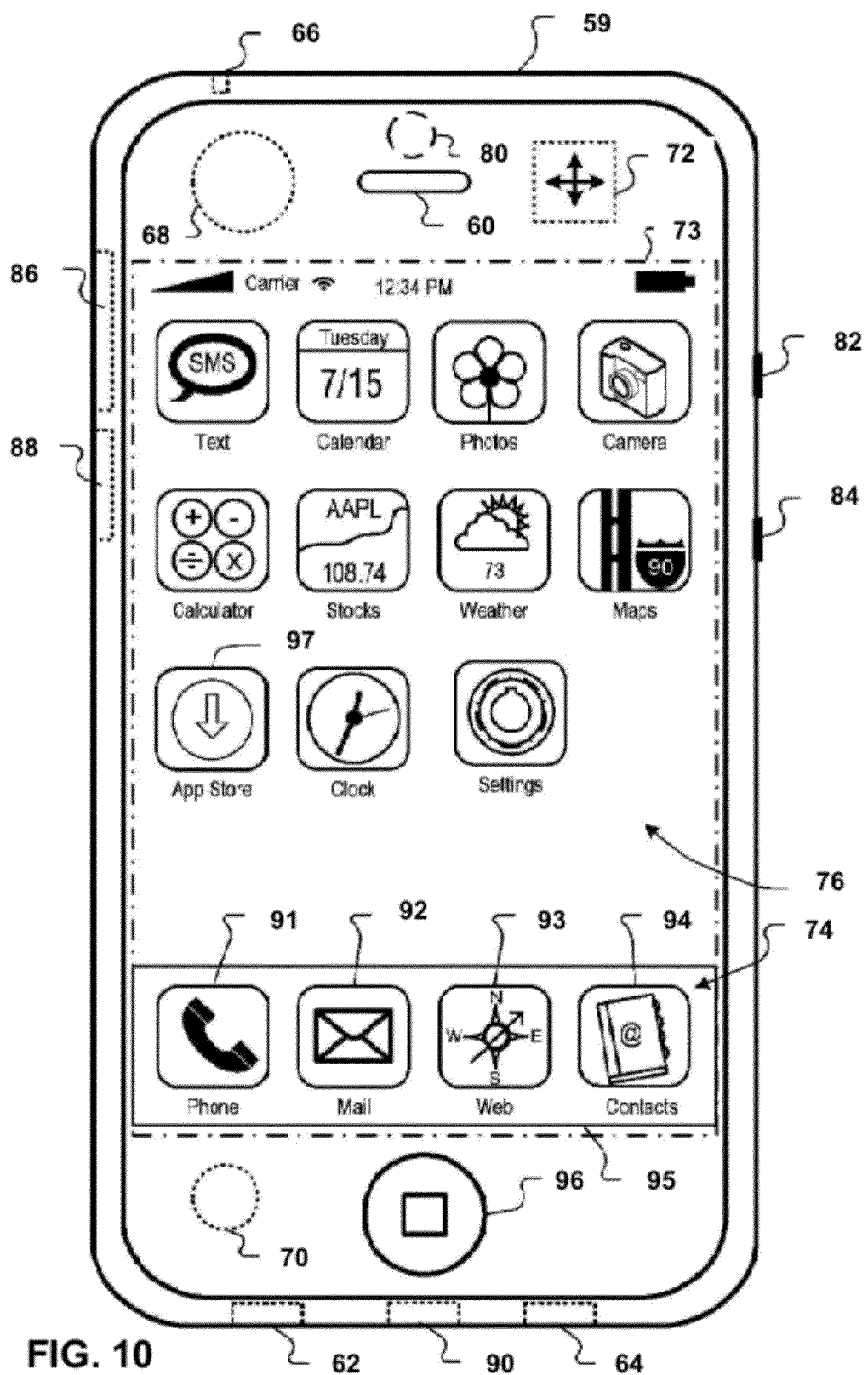
FIG. 10 is a block diagram of an exemplary mobile device that can be used in the invention.

FIG. 10 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 11:
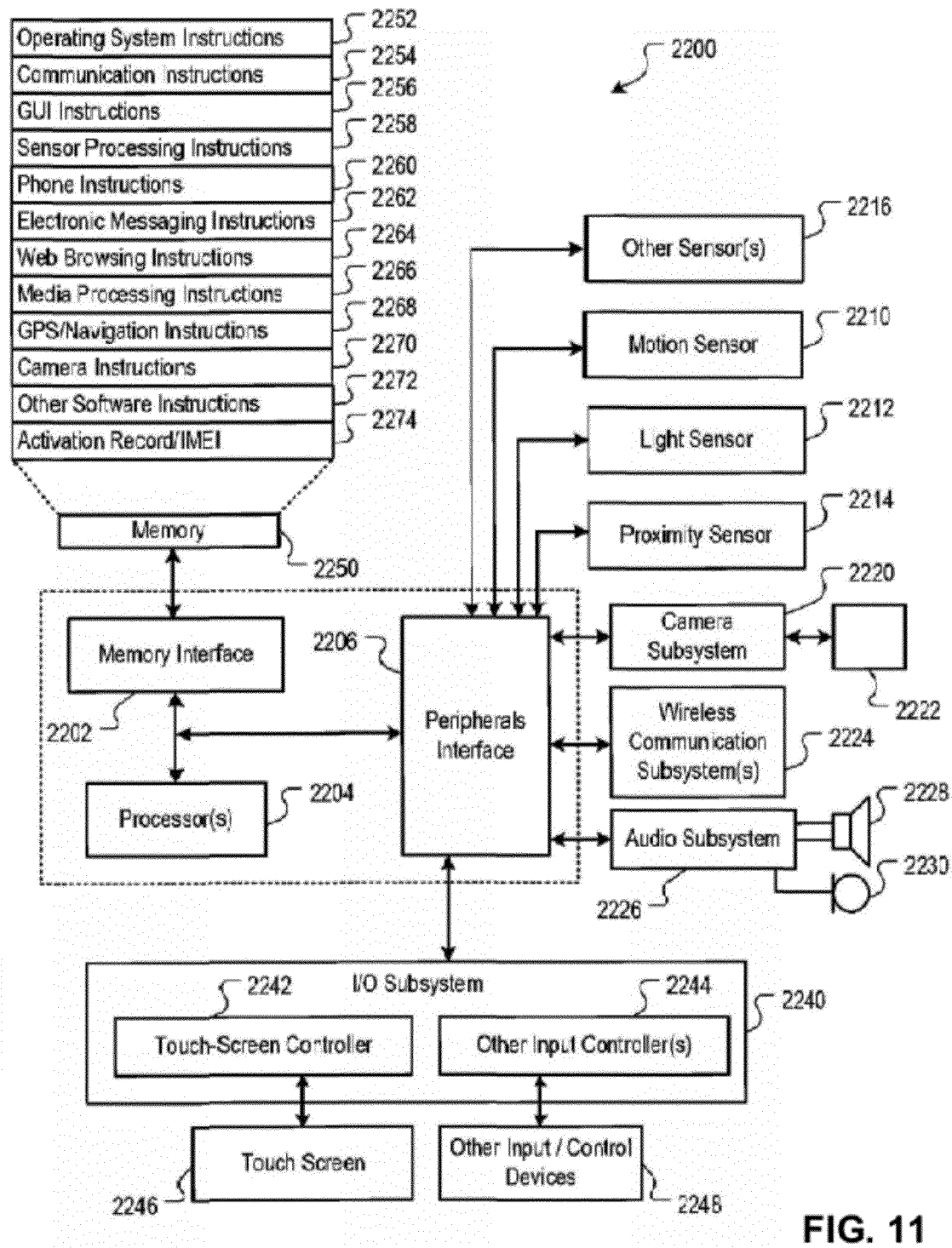
FIG. 11 is a block diagram of an exemplary implementation of the mobile device.

FIG. 11 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system for generating a synthetic radio channel, comprising:
    a server in communication with a plurality of mobile communications devices that provide their geolocation information to the server;
    the server receiving user voice data from the mobile communication devices;
    the server associating each mobile communication device with a group of mobile communication devices within a geographic proximity radius to the each mobile communication device;
    the server generating a synthetic customized voice channel for each mobile communication device comprising a stream of chunks of voice data generated from the voice data provided by the mobile communication devices of the group; and
    the server dynamically adjusting the geographic proximity radius for each mobile communication device and which mobile communication devices are associated with the group based on (a) movement of each mobile communication device, (b) a number of mobile communication devices in the group associated with the each mobile communications device, (c) movement of the each mobile communications device, and (d) and movement of the mobile communication devices in the group,
    wherein the server dynamically adjusting a length of at least some chunks based on the movement of each mobile communication device, a number of mobile communication devices in the group associated with the each mobile communications device or movement of the mobile communication devices in the group.

2. The system of claim 1, wherein the server provides advertising to at least some mobile communication devices based on geographic location of the at least some mobile communication devices.

3. The system of claim 1, wherein the server provides advertising to at least some mobile communication devices based on a historic pattern of movement of the at least some mobile communication devices.

4. The system of claim 1, wherein the group is defined, at least in part, based on social network association of users of the mobile communication devices.

5. The system of claim 1, wherein the server provides advertising to at least some mobile communication devices based on profiles of their users that are maintained on the server.

6. The system of claim 1, wherein at least some mobile communications devices are operating in a demo mode that does not permit their users to generate the voice data for channels for other mobile communications devices.

7. The system of claim 1, further comprising a database of chunks of voice data.

8. The system of claim 7, wherein the database includes private voice messages intended only for specified mobile communications devices.

9. The system of claim 1, wherein the server generates synthetic voice channels that can only be received by specific subscribers.

10. The system of claim 1, wherein the geographic proximity radius of at least some of the mobile communication devices is determined based on proximity to a mobile base station.

11. The system of claim 1, wherein at least some of the mobile communications devices can send, through the server, private messages to any device connected to a mobile network.

12. A method for generating a synthetic radio channel, comprising:

connecting a server to a plurality of mobile communications devices;

receiving geolocation information from the mobile communications devices;

receiving user voice data from the mobile communication devices;

associating each mobile communication device with a group of mobile communication devices within a geographic proximity radius to the each mobile communication device; and generating a synthetic customized voice channel for each communication device comprising a stream of chunks of voice data generated from the voice data provided by the communication devices of the group of mobile communication devices; and dynamically adjusting the geographic proximity radius for each mobile communication device and which mobile communication devices are associated with the group based on (a) movement of each mobile communication device, (b) a number of mobile communication devices in the group associated with the each mobile communications device, (c) movement of the each mobile communications device, and (d) movement of the mobile communication devices in the group, dynamically adjusting a length of at least some chunks based on the movement of each mobile communication device, a number of mobile communication devices in the group associated with the each mobile communications device or movement of the mobile communication devices in the group.

13. The method of claim 12, further comprising providing advertising to at least some mobile communication devices based on geographic location of the mobile communication devices.

14. The method of claim 12, wherein the group is defined, at least in part, based on social network association of users of the mobile communication devices.

15. The method of claim 12, further comprising providing advertising to at least some mobile communication devices based on profiles of their users that are maintained on the server.

16. The method of claim 12, further comprising generating synthetic voice channels that can only be received by specific subscribers.

17. The method of claim 12, further comprising altering the voice data chunks to (a) disguise a voice of a subscriber, (b) remove speech defects, or (c) compress a duration of the voice data chunks.

18. A computer program product embodied in a non-transitory storage medium containing computer code for performing the steps of claim 12.

* * * * *